Oct. 8, 1963            G. W. HARRY            3,106,104

ALTITUDE COMPENSATED PRESSURE SUPPLY MECHANISM

Filed Jan. 25, 1961            3 Sheets-Sheet 1

INVENTOR.
BY *Gordon W. Harry*

ATTORNEY

Oct. 8, 1963  G. W. HARRY  3,106,104
ALTITUDE COMPENSATED PRESSURE SUPPLY MECHANISM
Filed Jan. 25, 1961  3 Sheets-Sheet 2

INVENTOR.
Gordon W. Harry
BY
R. L. Spencer
ATTORNEY

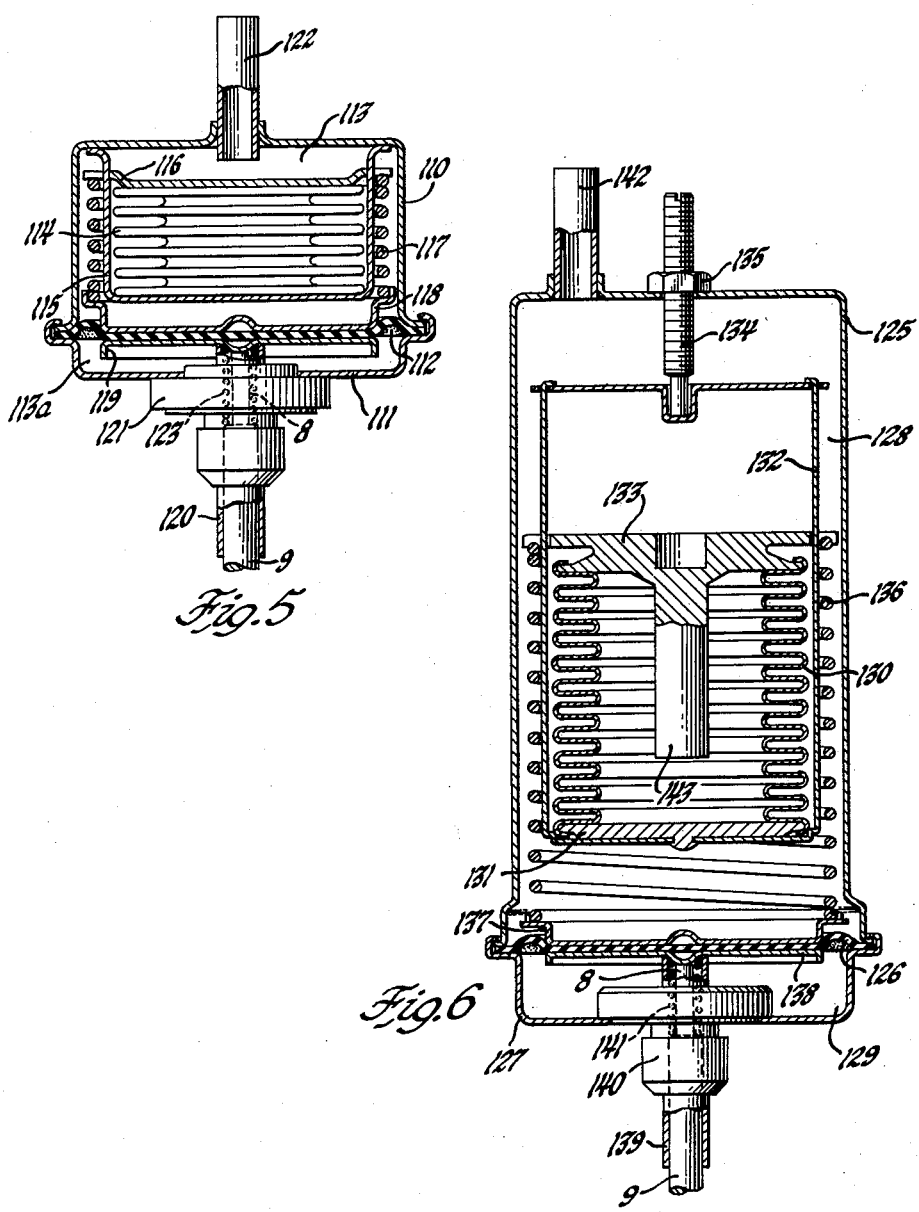

United States Patent Office 3,106,104
Patented Oct. 8, 1963

3,106,104
ALTITUDE COMPENSATED PRESSURE SUPPLY MECHANISM
Gordon W. Harry, Flushing, Mich., assignor to General Motors Corporation, Detroit, Mich., a corporation of Delaware
Filed Jan. 25, 1961, Ser. No. 84,834
11 Claims. (Cl. 74—472)

This invention relates to pressure regulator control systems for automatic transmissions and more particularly to an improved altitude compensated modulator for use in such systems. In automotive vehicle automatic transmission control systems it has been the practice to provide a line pressure regulator valve wherein the regulated line pressure in the transmission control system is varied in proportion to engine torque as a function of intake manifold vacuum. One such structure is shown in the patent to Rosenberger 2,766,639, issued October 16, 1956. While the variation of line pressure in accordance with changes in engine manifold vacuum as taught by Rosenberger is generally satisfactory, it has been found that undesirable variation in line pressure occurs at relatively high altitudes as compared to normal operation at lower altitudes. This variation in line pressure which results from a loss of engine manifold vacuum when a vehicle is operated at high altitudes causes the transmission control system to accomplish a change of transmission drive ratio at a different "shift point" than that obtained when operating the same vehicle at more normal altitudes. The altitude compensated modulator arrangement herein disclosed corrects for the loss of engine vacuum experienced at increasing altitudes and renders the line pressure control valve effective to maintain a normal range of line pressure irrespective of the varying altitudes at which the vehicle may be operated. With the altitude compensated modulator installed the shift of drive ratio will be accomplished at the same engine torque signal at either normal or relatively high altitudes irrespective of the loss of engine vacuum obtained at such relatively high altitudes.

FIGURE 5 is a sectional view through a fourth embodiment of an altitude compensator modulator for use with the pressure regulator valve of FIGURE 1.

FIGURE 6 is a sectional view through a fifth embodiment of an altitude compensator modulator for use with the pressure regulator valve of FIGURE 1.

Figure 1:
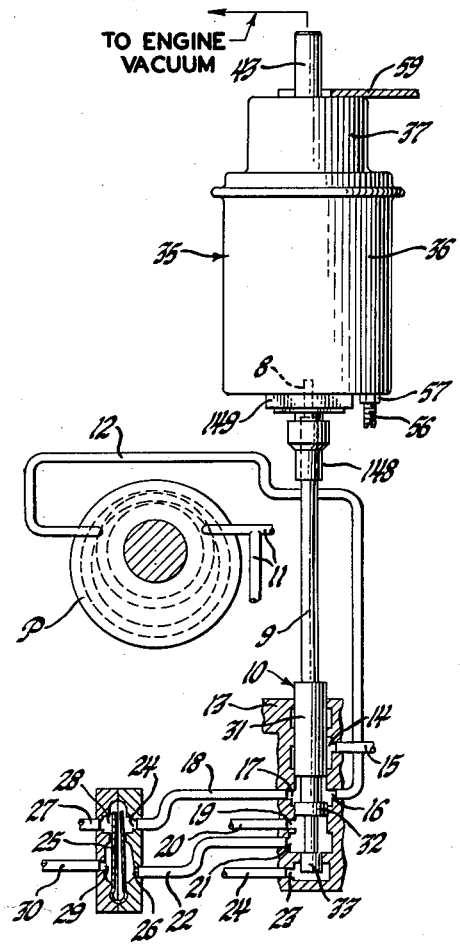
FIGURE 1 is a schematic diagram illustrating a pressure regulator valve for regulating hydraulic pressure supplied to a vehicle transmission control system incorporating an altitude compensator modulator.

Referring to FIGURE 1 there is shown a line pressure regulator valve 10 with an altitude compensator modulator 35 attached thereto to render the line pressure regulator valve effective to deliver the same line pressure for a given throttle opening at relatively high altitudes as at lower altitudes. The valve shown in FIGURE 1 and the control system in which it is incorporated is the same as that shown in the patent to Rosenberger 2,766,639 and need not be described in detail. The altitude compensator modulator for controlling the valve 10 is shown in detail in FIGURE 2.

In FIGURE 1, there is shown an engine driven pump P adapted to draw fluid from a sump (not shown) through a suction passage 11 and deliver the same under pressure to a passage 12. A pressure regulator valve housing 13 is provided with a port 14 connected to passage 15, a port 16 connected to passage 12, a port 17 connected to a passage 18, a port 19 leading to a passage 20, a port 21 leading to a passage 22, and a port 23 connected to a passage 24. Passage 15 is an exhaust passage. Passage 18 connects to a port 24 of a check valve 25. Passage 20 is a feed passage for delivering pressure to a hydrodynamic torque converter unit (not shown) to supply the converter with fluid. Passage 22 connects to a port 26 of check valve 25. Passage 24 is supplied with variable pressure from a speed responsive governor, not shown. A passage 27 admits pressure from a vehicle speed responsive pump (not shown) to a port 28 of check valve 25. A port 29 delivers pressure from check valve 25 to a passage 30 connected to supply pressure to a drive range selector valve (not shown). The various ports and passages described and the check valve 25 have exact counterparts as shown in the patent to Rosenberger 2,766,639 as follows: 14, 15; 76, 164 of Rosenberger; 12, 16; 165, 77 of Rosenberger; 17, 18, 24; 78, 166, 86 of Rosenberger; 19, 20; 79, 168 of Rosenberger; 21, 22, 26; 80, 169, 88 of Rosenberger; 23, 24; 81, 171 of Rosenberger. The control system for controlling transmission drive ratio is the same as Rosenberger except for the improved altitude compensated modulator controlling pressure regulator valve 10. Valve 10 is provided with three spaced lands 31, 32 and 33, the land 33 being of smaller diameter than lands 31 and 32.

Figure 2:
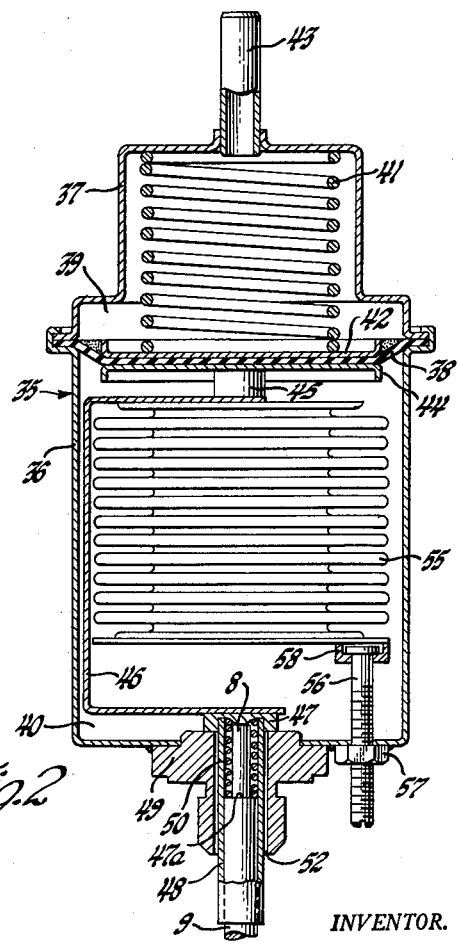
FIGURE 2 is a sectional view through one embodiment of an altitude compensator modulator for use with the pressure regulator valve of FIGURE 1.

An altitude compensator modulator 35 shown in FIGURE 2 comprises a main cylindrical body 36 and a cup-shaped cover 37 joined to body 36. A flexible diaphragm 38 extends transversely of body 36 and cover 37 at the juncture of the body and cover to divide the modulator assembly into chambers 39 and 40, the chambers being sealed off from each other by diaphragm 38. A spring 41 disposed in chamber 39 and seated on cover 37 and a diaphragm protector 42 on diaphragm 38 urges the diaphragm downwardly as viewed in FIGURE 2. A pipe 43 in the end of cover 37 connects chamber 39 to the engine intake manifold as a source of engine vacuum. Diaphragm 38 is connected to a valve stem 9 of pressure regulator valve 10 by means of a diaphragm protector 44, a force transmitting strap 46 rigidly connected to diaphragm protector 44 by a boss 45, the force transmitting strap being connected to a sleeve 48 by means of a boss 47. The sleeve 48 extends outwardly from body 36 through a nipple 49 fixed to the body. A spring 50 seats upon boss 47 and land 47a on valve stem 9 to provide initial pressure regulation on the part of valve 10, the spring fitting over a reduced stem portion 8 at the upper end of valve stem 9. Spring 50 normally acts to force valve 10 into housing 13 to maintain a given minimum line pressure. In the event that the vehicle is in operation, the effect of engine vacuum in chamber 39 will normally be effective to raise boss 47 off of nipple 49 to permit chamber 40 to be connected to atmosphere through the space between sleeve 48 and nipple 49 indicated at 52.

A sealed bellows 55 disposed in chamber 40 seats at one end on strap 46 and at the opposite end on three adjusting screws 56, one being shown in FIGURE 2. Each adjusting screw 56 is threaded through a nut 57 fixed to case 36 and extends into a retainer 58 fixed to bellows 55. The action of bellows 55 in opposing the action of spring 41 may be initially adjusted to calibrate the bellows by means of adjusting screws 56.

Considering the operation of the arrangement of FIGURE 2, it will be noted that land 32 is of greater diameter than land 33. Fluid pressure admitted to the valve bore intermediate lands 33 and 32 from passage 22 tends to move the valve to connect port 16 to exhaust port 14. In addition, with the vehicle in motion, governor pressure, which increases with increase of vehicle speed admitted to the end of land 33 through port 23 tends to move the valve to connect supply port 16 to exhaust port 14. These forces are opposed by spring 41 which through diaphragm 38, member 46, and sleeve 48 exerts a force on valve stem 9 tending to move the valve inwardly in valve housing 13 to block off port 16 from exhaust port 14. The effective force of spring 41 is varied in accordance both with changes in engine vacuum and atmospheric pressure. At closed engine throttle, the engine vacuum in chamber 39 acting on diaphragm 38 will be maximum, causing maximum compression of spring 41. With the effective force of spring 41 thus limited, valve 10 is effective to deliver minimum line pressure to passage 18. As the engine throttle is opened to accelerate the vehicle, the vacuum in chamber 39 diminishes and reduces the effective force of diaphragm 38 tending to compress spring 41. Spring 41 is therefore permitted to expand, thereby forcing valve 10 into housing 13 to increase the pressure delivered to passage 18.

Assuming the vehicle is operated at relatively low altitudes, the variation of atmospheric pressure is such that the line pressure delivered by valve 10 remains within acceptable limits such that the transmission drive ratio control system is effective to accomplish change of drive ratio at the proper vehicle speed and engine throttle opening for satisfactory performance. It has been found however, that at relatively high altitude operation as in mountainous country that due to loss of engine vacuum in chamber 39, the line pressure for a given engine throttle opening and vehicle speed will increase to an undesirable high pressure. Since the governor pressure used to accomplish shift of drive ratio is derived from line pressure, the governor pressure will likewise increase for a given vehicle speed as the line pressure increases due to loss of engine vacuum. This causes the control system to change the drive ratio at a different speed for a given engine throttle opening than that obtained at more normal operating altitudes. Otherwise stated the transmission will shift ratio at a different engine torque signal at high altitudes than at low altitudes.

The provision of the altitude compensated modulator including bellows 55 corrects for the loss of vacuum experienced at increased altitudes to maintain the line pressure constant for a given engine throttle opening irrespective of change of altitudes so that the transmission control system will cause shift of drive ratio at the same engine torque signal, for a given vehicle speed, irrespective of change of altitude. Sylphon bellows 55 is a sealed unit having atmospheric pressure therein. As the altitude of the vehicle increases, bellows 55 expands to oppose the increased thrust of spring 41 resulting from loss of engine vacuum in chamber 37. As the altitude decreases, bellows 55 will contract. Thus as the vacuum in chamber 39 increases due to lower altitude operation of the vehicle, the net thrust of spring 41 on valve stem 9 remains constant for a given engine throttle setting. The line pressure delivered by valve 10 to the transmission is therefore unaffected by changes in altitude. As stated, the adjusting screws 57 provide for calibrating the action of bellows 55 and the line pressure delivered by valve 10. In FIGURE 1, the altitude compensator modulator is shown secured to a fixed support 59 which may be secured to the engine transmission, not shown.

Figure 3:
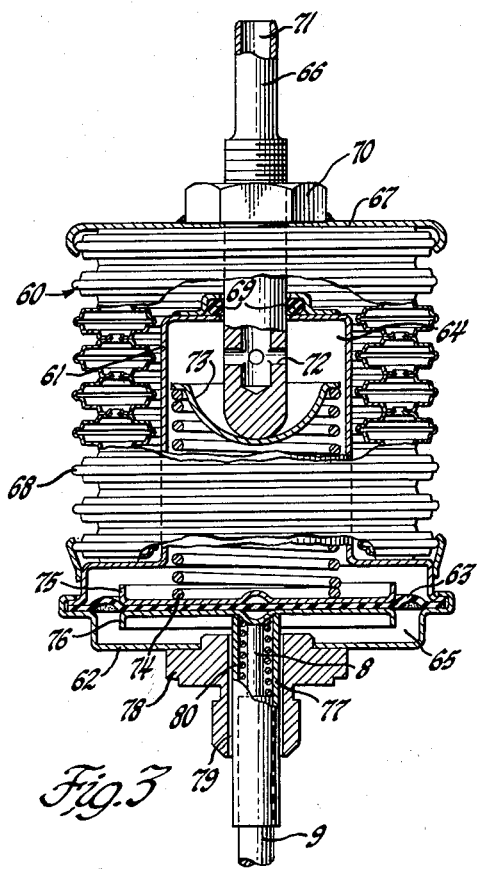
FIGURE 3 is a sectional view through a second embodiment of an altitude compensator modulator for use with the pressure regulator valve of FIGURE 1.

In FIGURE 3 there is shown a modified altitude compensated modulator wherein the sealed bellows containing air at atmospheric pressure is supported exterior of the body and cover rather than within the body and cover as illustrated in FIGURE 2. The modulator 60 of FIGURE 3 includes a main body 61 and a cover 62 having a flexible diaphragm 63 clamped therebetween and forming a vacuum chamber 64 and a chamber 65 connected to atmosphere. A hollow rod 66 fixed to an end plate 67 carried by a bellows 68 extends into the center portion of the bellow through a seal 69 on body 61 into vacuum chamber 64. Rod 66 is screw-threaded in a nut 70 fixed to end plate 67 so that the depth of penetration of the rod into chamber 64 may readily be adjusted. Passages 71 and cross passages 72 in rod 66 connect chamber 64 to an engine intake manifold vacuum source. A spring seat 73 bearing against one end of rod 66 provides a seat for one end of a spring 74. The opposite end of spring 74 seats on a diaphragm protector 75 fixed to diaphragm 63. A diaphragm protector 76 carried by diaphragm 63 has fixed thereto a hollow sleeve 77 extending through a nipple 78 on cover 62, the sleeve being movable with diaphragm 63. An air gap 79 between sleeve 77 and nipple 78 connects chamber 65 to atmosphere. A spring 80 seated on diaphragm protector 76 and a land on valve stem 9 urges the valve stem outwardly to provide a minimum line pressure. Bellows 68 is fixed to main body 61 by means of a clamp 81. The operation of the structure of FIGURE 3 is similar to that of FIGURE 2 in that the bellows expands at increasing altitudes thereby permitting rod 66 to move outwardly to reduce the depth of penetration of rod 66 into vacuum chamber 64. This limited movement of rod 66 and spring seat 73 weakens the force applied to diaphragm 63 by spring 74 to compensate for the loss of vacuum in chamber 64. Thus, the position of the line pressure regulator valve in its housing is not varied as a result of changes of atmospheric pressure. In FIGURE 2, the altitude compensator is shown operatively connected to the valve stem 9 of the pressure regulator valve in the same manner as FIGURE 2.

Figure 4:
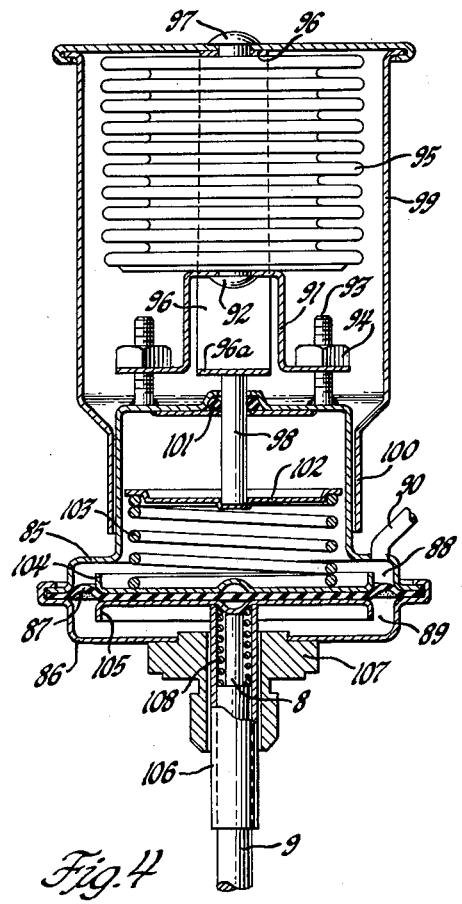
FIGURE 4 is a sectional view through a third embodiment of an altitude compensator modulator for use with the pressure regulator valve of FIGURE 1.

In FIGURE 4 a third embodiment is shown wherein the bellows is carried by the main body and acts upon the diaphragm spring through a pin. Main body 85 and cover 86 have clamped thereto a diaphragm 87 cooperating with the body and cover to form a vacuum chamber 88 and a chamber 89. Chamber 88 is connected to an engine intake manifold as a source of manifold vacuum through a nipple 90, and suitable tubing, not shown. A bracket 91 fixed to one end of a sealed bellows 95 by a suitable fastener 92 is supported upon a plurality of upstanding studs 93 fixed to the external surface of body 85. A rigid member 96 fixed to the bellows 95 at the end of the bellows opposite bracket 91 by means of a suitable fastener 97 extends around the exterior surface of the bellows to form a seat 96a for a movable pin 98. Fastener 97 also clamps one end of bellows 95 to a closed container 99 having surfaces 100 in slip fit relationship to body 85. Pin 98 extends through a seal 101 into vacuum chamber 88 forming a support for a spring seat 102. A spring 103 seats upon seat 102 and a diaphragm protector 104. A hollow sleeve 106 fixed to a diaphragm protector 105 extends outwardly from chamber 89 through a nipple 107 fixed to cover 86 to receive valve stem 9. A spring 108 seated upon valve stem 9 and diaphragm protector 105 biases the valve stem 9 to position the valve to deliver minimum line pressure. Adjusting nuts 94 are provided on studs 93 to calibrate the action of bellows 95.

In operation, bracket 91 is the reaction fixed member holding the inner end of bellows 95 in a given position. As the altitude at which the vehicle is operated increases, the engine manifold vacuum in chamber 88 decreases. At the same time, bellows 95, filled with air at sea level pressure expands moving cover 99 and pin seat 96a upwardly as viewed in the drawing. This permits spring seat 102 to move upwardly to weaken spring 103. This weakening of spring 103 is calibrated to counteract the effect of loss in vacuum occurring in chamber 88 such that the line pressure delivered by the pressure regulator valve remains a true function of engine torque demand as the elevation at which the vehicle is operated increases.

In FIGURE 5 there is shown an alternative arrangement of a modulator assembly wherein the bellows employed is evacuated rather than containing air at atmospheric pressure at sea level as is the case in the embodiments shown in FIGURES 2 through 4. A case 110 supports a cover 111 thereon, there being a diaphragm 112 clamped between the cover and case to provide a chamber 113 connected to engine manifold vacuum and a chamber 113a connected to atmosphere. An evacuated sealed bellows 114 has one end supported to case 110 by a support 115 in such manner as to be fixed against movement. The opposite end of bellows 114 has a spring seat 116 carried thereby forming a seat for a spring 117. A diaphragm protector 118 fixed to diaphragm 112 forms a seat for the opposite end of spring 117. A hollow sleeve 120 seated on a diaphragm protector 119 extends outwardly from chamber 113a through a nipple 121 fixed to cover 111. Valve stem 9 extends into sleeve 120 for operation by diaphragm 112. A spring 123 seated on diaphragm protector 119 and a boss on stem 9 biases the valve for establishing initial minimum line pressure. Chamber 113 is connected to an engine intake manifold (not shown) through suitable tubing 122.

In operation at relatively low altitudes the atmospheric pressure in chamber 113a acting on diaphragm 112 will be relatively high such that spring 117 will be partially compressed applying force to seat 116 partially expanding evacuated bellows 114. The engine vacuum in chamber 113 for a given throttle setting and engine speed will be relatively high over that obtained in chamber 113 for the same throttle setting and engine speed at higher elevations. As the elevation increases both the vacuum in chamber 113 and atmospheric pressure in chamber 113a will diminish so that the evacuated bellows will partially collapse to move seat 116 to apply a greater load on spring 117. The spring will therefore apply an increased force to diaphragm 112 tending to push valve stem 9 outwardly such that the pressure delivered by the pressure regulator valve is not affected by changes in elevation at which the vehicle is operated. The bellows 114 changes the position of spring seat 116 to compensate for loss of vacuum in chamber 113 and drop of atmospheric pressure in chamber 113a occurring as a result of changes in elevation.

The arrangement in FIGURE 6 is similar to that of FIGURE 5 but adds additional calibration features and a stop member effective to limit the range of travel of the spring seat in one direction.

In FIGURE 6, an outer case 125 has clamped thereto a cover 127 with a diaphragm 126 disposed between the cover and case forming a vacuum chamber 128 and a chamber 129 connected to atmosphere. An evacuated bellows 130 has one end 131 thereof fixed to a support member 132 extending through the opposite end 133 of the bellows. Support member 132 is shaped to receive one end of an adjusting screw 134 threaded through a nut 135 fixed to case 125. End 133 of bellows 130 forms a spring seat for a spring 136. A diaphragm protector 137 receives the opposite end of spring 136. A second diaphragm protector 138 contacts a sleeve 139 slidably retained in a nipple 140 fixed to cover 127. Valve stem 9 is received by sleeve 139. A spring 141 is disposed between a shoulder on stem 9 and diaphragm protector 138. Air enters chamber 129 through the clearance between sleeve 139 and nipple 140. A nipple 142 connects chamber 128 to a source of engine manifold vacuum (not shown). A stop member 143 carried by end 133 of bellows 130 extends into the center portion of the bellows and may contact end 131 of the bellows to limit the range of travel of end 133 toward end 131 of the bellows. The position of end 131 in chamber 128 may be adjusted by screw 134 to vary the tension on spring 136.

In all of the embodiments shown, the sealed bellows either expands or contracts in response to a drop in atmospheric pressure to weaken the force effect of the spring on the diaphragm. The force of the spring is weakened a sufficient amount to compensate for the loss of engine vacuum in the vacuum chamber which occurs at increasing elevations. In FIGURE 2 the bellows expands directly against the diaphragm to oppose the force of the spring to compensate for loss of engine vacuum in chamber 39. In FIGURE 3 the bellows expands to move plunger 66 and spring seat 73 away from the spring to weaken the spring as the atmospheric pressure drops, thereby compensating for loss of engine vacuum in chamber 64 at increasing elevations. In FIGURE 4 the bellows contracts to move the spring seat 102 away from the spring to compensate for loss of engine vacuum in chamber 88 at increased altitude. In FIGURES 5 and 6 the free end of the bellows moves away from the spring to weaken the force effect of the spring as the atmospheric pressure drops and the engine vacuum drops due to increased altitudes.

In all embodiments the pressure range delivered by the pressure regulator valve remains the same at relatively high and relatively low altitudes. In all of the embodiments except that of FIGURE 3 the bellows is positioned within the housing so as to be protected from dirt and moisture. In the embodiment in FIGURE 3 the bellows is carried by the housing externally of the housing and constitutes a movable support for plunger 66 and spring seat 73.

It will be apparent that the various embodiments of the altitude compensator modulator are specifically designed to be quickly and easily installed on vehicle transmissions presently in use as well as for factory installation.

I claim:

1. In a hydraulic control system for supplying fluid under pressure to a transmission for an engine driven vehicle subject to operation at different altitudes, a pump for supplying hydraulic fluid under pressure to said transmission, passage means for conducting fluid under pressure from said pump to said transmission, a pressure regulator valve for regulating the pressure supplied to said transmission through said passage means, means operable upon said valve for positioning said valve to deliver a predetermined range of pressure including spring means and engine vacuum responsive means, the pressure delivered by said valve being varied in response to changes in engine vacuum, and an altitude compensator operably connected to said valve through said spring means, said altitude compensator being effective to oppose the force effect of said spring to compensate for the loss of engine vacuum at relatively high altitude operation such that the range of pressure delivered by said pressure regulator valve remains the same at relatively high altitudes as that delivered by the valve at relatively low altitudes.

2. In a hydraulic control system for supplying fluid pressure to a transmission control system for an engine driven vehicle subject to operation at different altitudes, a pump for supplying hydraulic fluid under pressure to said control system, passage means for conducting fluid under presssure from said pump to said control system, a pressure regulator valve for regulating the pressure supplied to said control system through said passage means, said pressure regulator valve including a movable valve member movable in one direction to increase the pressure and movable in the opposite direction to decrease the pressure in said control system, spring means yieldably biasing said valve member to increase the pressure delivered by said valve, engine vacuum responsive means operably connected to said valve member and to a source of engine vacuum for moving said valve member to decrease the pressure delivered by said valve, said spring means and engine vacuum responsive means being normally effective to position said valve member to deliver a predetermined range of pressure to said control system, the pressure delivered by said valve member being varied in accordance with changes in engine vacuum, and an altitude compensator operatively connected to said valve member through said spring means, said altitude compensator acting in opposition to said spring means to compensate for loss of engine vacuum to maintain the same range of pressure when said vehicle is operated at relatively high altitudes as that maintained when said vehicle is operated at relatively low altitudes.

3. In a hydraulic control system for supplying fluid pressure to a transmission control system for an engine driven vehicle subject to operation at different altitudes, an engine driven pump for supplying hydraulic fluid under pressure to said control system, passage means for conducting fluid under pressure from said pump to said control system, a pressure regulator valve in said passage means for regulating the pressure supplied to said control system, spring means normally biasing said pressure regulator valve to increase the pressure delivered by said valve, vacuum responsive means operatively connected to a source of engine vacuum for opposing the action of said spring means, said spring means and vacuum responsive means being normally effective to position said valve to vary the line pressure within a predetermined pressure range, the pressure delivered by said valve being varied within said range in response to changes in vacuum applied to said vacuum responsive means, and a bellows operatively connected to said vacuum responsive means through said spring means, said bellows acting in opposition to said spring with increasing effect in response to increasing drop of atmospheric pressure to render said pressure regulator valve effective to deliver pressure within said pressure range irrespective of loss of engine vacuum when said vehicle is operated at relatively high elevations.

4. In a control system for supplying fluid pressure to a transmission control system for an engine driven vehicle subject to operation at different altitudes, a pump for supplying hydraulic fluid under pressure to said control system, passage means for delivering fluid under pressure from said pump to said control system, a pressure regulator valve in said passage means for regulating the pressure supplied to said control system, means operable upon said pressure regulator valve for positioning said valve to deliver a predetermined range of pressure including spring means and engine vacuum responsive means, the pressure delivered by said valve being varied in response to changes in engine vacuum, an altitude compensator connected to said vacuum responsive means through said spring means, said altitude compensator being effective to increasingly oppose said spring means with increase in altitude to compensate for loss of engine vacuum at relatively high altitudes such that the range of pressure delivered by said valve remains constant irrespective of changes in altitude, and manually adjustable means for calibrating the action of said altitude compensator.

5. In a control system for supplying fluid pressure to a transmission control system for an engine driven vehicle subject to operation at different altitudes, an engine driven pump for supplying hydraulic fluid under pressure to said control system, passage means for conducting fluid from said pump to said control system, a pressure regulator valve disposed in said passage means for regulating pressure supplied to said control system, a container, a diaphragm supported in said container and dividing said container into first and second chambers, means connecting said first chamber to said engine as a source of engine vacuum, said second chamber being connected to atmosphere, means connecting said diaphragm to said pressure regulator valve, said diaphragm and pressure regulator valve being movable as a unit, spring means for urging said diaphragm and pressure regulator valve in one direction, the vacuum in said first chamber opposing the action of said spring means, the pressure delivered by said pressure regulator valve being varied throughout a predetermined range of pressure in response to changes in vacuum in said first chamber, and an altitude compensator operatively connected to said diaphragm through said spring means, said compensator being increasingly effective to oppose said spring means with increase in altitude to compensate for loss of engine vacuum at such increased altitude such that the pressure range of pressure delivered by said pressure regulator valve remains constant irrespective of change of altitude.

6. In a control system for supplying fluid pressure to a transmission control system for an engine driven vehicle subject to operation at different altitudes, an engine driven pump for supplying hydraulic fluid under pressure to said control system, passage means for conducting fluid under pressure from said pump to said control system, a pressure regulator valve disposed in said passage means for regulating pressure supplied to said control system, a housing, a diaphragm supported in said housing dividing said housing into first and second chambers, means connecting said first chamber to an intake manifold of said engine as a source of engine vacuum, said second chamber being connected to atmosphere, means connecting said diaphragm to said pressure regulator valve such that said diaphragm and valve are movable as a unit, a spring in said vacuum chamber for urging said diaphargm in one direction, the vacuum in said first chamber being operable upon said diaphragm to oppose the action of said spring, the pressure delivered by pressure regulator valve being varied throughout a predetermined range in pressure in response to changes in vacuum in said first chamber, and an expandable and contractable bellows operatively connected to said pressure regulator valve through said spring and diaphragm, said bellows being increasingly effective to oppose said spring with increase in altitude to compensate for loss of engine vacuum at such increased altitude such that the range of pressure delivered by said pressure regulator valve remains constant irrespective of change of altitude.

7. In a control system for supplying fluid pressure to a transmission control system for an engine driven vehicle subject to operation at different altitudes, an engine driven pump for supplying hydraulic fluid under pressure to said control system, passage means for conducting fluid discharged by said pump to said control system, a pressure regulator valve in said passage means for regulating the pressure supplied to said control system, a housing, a diaphragm supported in said housing dividing the same into first and second chambers, means connecting said first chamber to an intake manifold of said engine as a source of engine vacuum, said second chamber being connected to atmosphere, a spring disposed in said first chamber operable upon said diaphragm, means operatively connecting said diaphragm to said pressure regulator valve, the vacuum in said first chamber opposing the force of said spring on said diaphragm to regulate the pressure delivered by said pressure regulator valve within a predetermined range of pressure, said second chamber being connected to atmosphere, a sealed bellows expandable and contractable in response to changes in atmospheric pressure having one end seated on said housing and a movable end connected to said spring to vary the force applied to said diaphragm by said spring, said bellows being effective to increasingly decrease the force effect of said spring with increase in altitude to compensate for loss of vacuum in said first chamber with increase in altitude such that the range of pressure delivered by said pressure regulator valve remains the same irrespective of change of altitude.

8. In a hydraulic control system for supplying fluid under pressure to a transmission control system for an engine driven vehicle subject to operation at different altitudes, an engine driven pump connected to supply hydraulic fluid under pressure to said control system through passage means, a pressure regulator valve in said passage means for regulating the pressure supplied to said control system, a housing, a diaphragm fixed to said housing and dividing said housing into first and second chambers, means connecting said first chamber to an intake manifold of said engine as a source of vacuum, said second chamber being connected to atmosphere, said diaphragm being operatively connected to said pressure regulator valve, a spring yieldably urging said diaphragm and said pressure regulator valve in one direction, the vacuum in said first chamber being operative upon said diaphragm to oppose the force effect of said spring, and a sealed bellows having one end fixed to said housing and a movable end forming a reaction member for said spring, said bellows being movable in response to drop in atmospheric pressure to weaken said spring to thereby cause said pressure regulator valve to deliver the same range of pressure at relatively high elevations as that delivered at relatively low elevations.

9. In a hydraulic control system for supplying fluid under pressure to a transmission control system for an engine driven vehicle subject to operation at different altitudes, an engine driven pump connected to supply hydraulic fluid under pressure to said control system through suitable passage means, a pressure regulator valve disposed in said passage means for regulating the pressure supplied to said control system, a housing, a diaphragm fixed to said housing and operatively connected to said pressure regulator valve, said diaphragm dividing said housing into first and second chambers, means connecting said first chamber to a source of engine vacuum, said second chamber being connected to atmosphere, a spring in said first chamber for urging said pressure regulator valve in one direction, the vacuum in said first chamber being operative upon said diaphragm to oppose the force of said spring, a sealed bellows expandable and contractable with changes in atmospheric pressure having one end fixed against movement relative to said housing and a movable end for controlling the position of a seat for one end of said spring, said bellows being movable to vary the position of said movable spring seat to weaken the force of said spring on said diaphragm in response to drop in atmospheric pressure to thereby compensate for loss of vacuum in said vacuum chamber resulting from such drop in atmospheric pressure, the range of pressures delivered by said pressure regulator valve at relatively high altitudes being the same as that delivered at relatively low altitudes irrespective of the loss of vacuum at such relatively high altitudes.

10. In a control system for controlling the line pressure supplied to the transmission of an engine driven vehicle, a pump for supplying hydraulic fluid to said transmission, passage means for delivering fluid under pressure from said pump to said transmission, a line pressure regulator valve disposed in said passage means for controlling the pressure level of hydraulic fluid supplied to said transmission, means for controlling said valve to vary the hydraulic pressure supplied to said transmission in accordance with changes in engine torque demand including a housing, a flexible diaphragm dividing said housing into first and second chambers, respectively, means connecting said first chamber to atmosphere, means connecting said second chamber to a source of engine vacuum which varies in response to changes in engine torque demand, a spring seat movable relative to said diaphragm, a spring interposed between said movable spring seat and said diaphragm, a collapsible bellows having one end thereof fixed against movement relative to said housing and the other end thereof operatively connected to said movable spring seat for varying the position of said movable spring seat in response to changes in vacuum in said second chamber to position said valve to maintain the same range of line pressure delivered to said transmission irrespective of loss of engine manifold vacuum and reduction of atmospheric pressure at high altitudes as is maintained at relatively low altitudes.

11. In a hydraulic control system for supplying fluid under pressure to a transmission control system for an engine driven vehicle subject to operation at different altitudes, a pump, passage means for delivering fluid from said pump to said control system, a pressure regulator valve in said passage means for regulating the pressure supplied to said control system, a housing, a diaphragm dividing said housing into first and second chambers, respectively, said valve being operably connected to said diaphragm for movement in said passage in response to movement of said diaphragm, spring means seated upon siad diaphragm for moving said diaphragm and valve in one direction, means connecting said first chamber to the fuel intake manifold of said engine as a source of vacuum, said diaphragm being movable in response to increase of vacuum in said first chamber to reduce the effective thrust of said spring on said valve, means connecting said second chamber to atmosphere, and an expandable and contractible bellows movable in response to drop of atmospheric pressure to increasingly oppose the thrust effect of said spring with drop of atmospheric pressure to thereby maintain a constant range of fluid pressure delivered by said pressure regulator valve irrespective of drop of atmospheric pressure and irrespective of reduction of vacuum in said first chamber.

References Cited in the file of this patent

UNITED STATES PATENTS

| | | |
|---|---|---|
| 2,434,420 | Lichtenstein et al. | Jan. 13, 1948 |
| 2,544,612 | Paget | Mar. 6, 1951 |
| 2,638,107 | Teague | May 12, 1953 |
| 2,706,885 | Ostroff | Apr. 26, 1955 |
| 2,766,639 | Rosenberger | Oct. 16, 1956 |
| 2,940,559 | Bomhard | June 4, 1960 |